(12) United States Patent
Toy

(10) Patent No.: US 12,219,024 B2
(45) Date of Patent: *Feb. 4, 2025

(54) SYSTEMS AND METHODS FOR MODIFYING CONNECTIVITY AND CLOUD SERVICES

(71) Applicant: Verizon Patent and Licensing Inc., Basking Ridge, NJ (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,336

(22) Filed: Nov. 14, 2023

(65) Prior Publication Data
US 2024/0089334 A1    Mar. 14, 2024

Related U.S. Application Data

(63) Continuation of application No. 17/555,665, filed on Dec. 20, 2021, now Pat. No. 11,843,673.

(51) Int. Cl.
*H04L 67/00* (2022.01)
*G06F 9/54* (2006.01)
*H04L 67/51* (2022.01)
*H04L 67/60* (2022.01)

(52) U.S. Cl.
CPC ............... *H04L 67/34* (2013.01); *G06F 9/54* (2013.01); *H04L 67/51* (2022.05); *H04L 67/60* (2022.05)

(58) Field of Classification Search
CPC ....................................................... G06F 9/54
See application file for complete search history.

(56) References Cited

U.S. PATENT DOCUMENTS

| | | | |
|---|---|---|---|
| 9,201,882 B2 | 12/2015 | Gavade et al. | |
| 2002/0116655 A1 | 8/2002 | Lew et al. | |
| 2008/0207167 A1* | 8/2008 | Bugenhagen | H04Q 3/0062 |
| | | | 455/411 |
| 2013/0077534 A1 | 3/2013 | Hu et al. | |

(Continued)

OTHER PUBLICATIONS

"Access E-Line Service Control Business Requirements and Use Cases", Working Draft 4. 0. MEF W76. Jan. 2021, 50 pages.

(Continued)

*Primary Examiner* — Viet D Vu

(57) ABSTRACT

A method may include establishing, by a first service provider and via an application programming interface (API), an agreement with a second entity. The agreement may identify services that can be modified without submission of a new order. The method may also include receiving a first message requesting a change associated with a service and determining, by the first service provider, whether the requested change corresponds to a change that is permitted based on the agreement and whether resources are available in the first network to implement the requested change. The method may further include determining whether the requested change is accepted, sending a second message to the second entity that indicates whether the change is accepted and in response to determining that the change is accepted, automatically implementing the change to the service in the first network.

20 Claims, 8 Drawing Sheets

(56) References Cited

U.S. PATENT DOCUMENTS

| | | | |
|---|---|---|---|
| 2013/0130642 A1* | 5/2013 | Joul | H04L 41/5029 |
| | | | 455/406 |
| 2015/0074279 A1* | 3/2015 | Maes | H04L 67/51 |
| | | | 709/226 |
| 2015/0227989 A1 | 8/2015 | Chattopadhyay et al. | |
| 2015/0288767 A1* | 10/2015 | Fargano | H04L 12/4641 |
| | | | 709/227 |
| 2016/0119405 A1 | 4/2016 | Karpoor et al. | |
| 2020/0204462 A1 | 6/2020 | Toy | |

OTHER PUBLICATIONS

"Access E-Line Service Control Business Requirements and Use Cases", Working Draft 5.0. MEF W76. Jul. 2021, 49 pages.
"Access E-Line Service Control Business Requirements and Use Cases", Working Draft MEF W76. Jan. 2020, 168 pages.
"Lifecycle Service Orchestration (LSO): Reference Architecture and Framework", MEF Standard. MEF 55.1. Jan. 2021, 76 pages.
"Quote Management Requirements and Use Cases", MEF Standard. MEF 80. Jul. 2021, 84 pages.

* cited by examiner

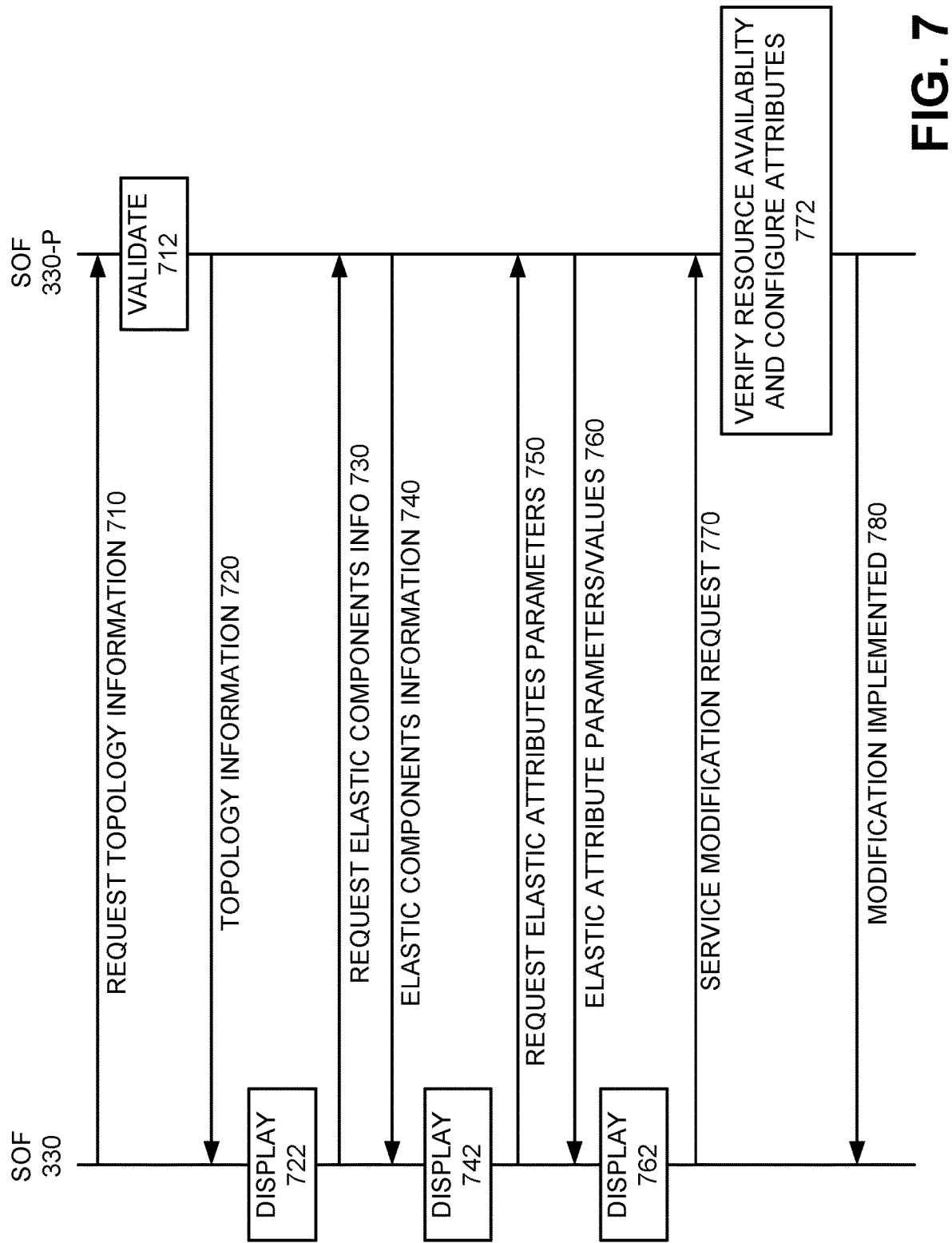

SYSTEMS AND METHODS FOR MODIFYING CONNECTIVITY AND CLOUD SERVICES

RELATED APPLICATION

This patent application is a Continuation of U.S. application Ser. No. 17/555,665 filed on Dec. 20, 2021, titled "Systems and Methods for Modifying Connectivity and Cloud Services," which issued as U.S. Pat. No. 11,843,673 on Dec. 12, 2023, the disclosure of which is hereby incorporated by reference herein in its entirety.

BACKGROUND INFORMATION

Service providers, such as Ethernet service providers or cloud service providers, often provide data communication services to users within a particular region. The Metro Ethernet Forum (MEF) has defined some procedures regarding ordering and provisioning of services, such as Access Ethernet Line (E-Line) services that provide connectivity to user devices at various locations.

For example, MEF 55.1 and MEF 80 describe processes for ordering services and obtaining costs quotes associated with products. However, there is currently no mechanism to permit on-demand modifications to an existing service without having to submit a new service order, obtain a new cost quote, etc.

BRIEF DESCRIPTION OF THE DRAWINGS

FIG. 7 is a signal flow diagram associated with interactions between a service provider and a partner.

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

Implementations described herein relate to modifying services, such a connectivity service (e.g., an Ethernet service, a software-defined wide area network (SD-WAN) service, an Internet protocol (IP) service or other connectivity services), cloud services including connectivity and applications, etc., without requiring a service provider or operator to submit a new order and obtain a cost quote from a partner operator implementing a portion of the service, such as a connectivity or a cloud service traversing two operators' networks. In one implementation described herein, a service provider and its partner operators agree upon parameters/attributes of a connectivity service or other cloud service that may be changed, in advance of actual requests for modifications to the parameters/attributes. In this manner, when a change is requested, an attribute of the connectivity or cloud service may be quickly changed, allowing for an efficient modification process that involves two operators or involves a user, such as an enterprise user/customer, and a service provider.

In some implementations, an application programming interface (API) used by the operators or service providers may facilitate identifying service attributes that may be changed. The API permits immediate, on-demand changes without requiring submission of a new order and without obtaining cost quotes. For example, an operator may interface with another operator via the API to identify a service topology and attributes that may be modified, as well as request changes to the attributes. The API enables efficient signaling/message exchanges between the service providers and partner operators or between a user/customer and a service provider, and allows modifications to services to be performed with little to no human intervention. For example, one operator may request a change to a service via an API and the second operator may automatically implement the change based on pre-approved types of changes, as described in detail below.

Figure 1:
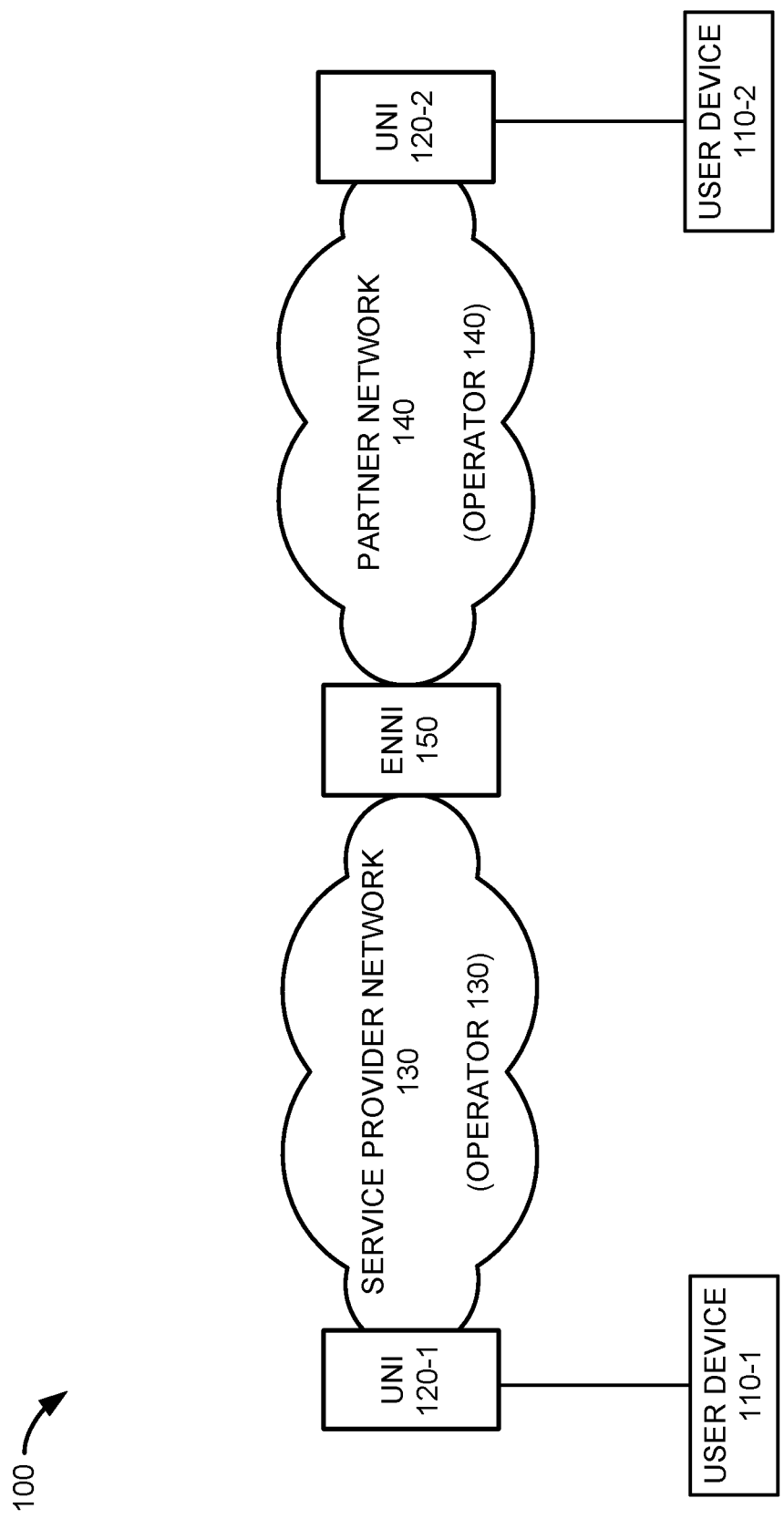
FIG. 1 illustrates an exemplary environment in which systems and methods described herein may be implemented.

FIG. 1 is a block diagram of an exemplary environment 100 in which systems and methods described herein may be implemented. Environment 100 may include user devices 110-1 and 110-2, user network interface (UNI) 120-1, UNI 120-2, service provider network 130 (also referred to herein as operator 130 or operator network 130), partner network 140 (also referred to as operator 140 or operator network 140) and external network-to-network interface (ENNI) 150.

User devices 110-1 and 110-2 (referred to herein individually as user device 110 or 110-x, or collectively as user devices 110) may include any computing device, such as a personal computer (PC), a laptop computer, a server, a tablet computer, a notebook, a netbook, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, etc., that includes communication functionality. User device 110-1 may connect to network 130 via UNI 120-1 and user device 110-2 may connect to partner network 140 via UNI 120-2. User devices 110 may also connect to other devices in environment 100 via any conventional technique, such as wired, wireless, optical connections or a combination of these techniques. User device 110 and the person associated with user device 110 (e.g., the party holding or using user device 110) may be referred to collectively as user device 110 in the description below.

UNI 120-1 and 120-2 (referred to herein individually as UNI 120 or collectively as UNIs 120) may include a network interface to which a user connects to transmit and receive information. For example, UNI 120 may include one or more computing devices or systems used to facilitate the transmission of information to/from a user. In one implementation, UNI 120 may act as an interface from a user (e.g., at user device 110) to allow user device 110 to obtain services, such as connectivity services (e.g., E-Line services, SD-WAN services, IP services, etc.) from an operator associated with networks 130 and 140.

Service provider network 130 may include one or more wired, wireless and/or optical networks that are capable of receiving and transmitting information (e.g., voice and/or video signals/data) including providing applications or access to applications, such as applications provided as part of cloud service offerings. For example, service provider network 130 may include one or more Ethernet networks, packet switched networks such as Internet Protocol/Multi-Protocol Label Switching (IP/MPLS) networks, Software Defined Networks (SDNs) or other type of packet networks. Service provider network 130 may also offer applications, including Virtual Machines (VMs), Containers, Virtual Network Functions (VNFs), Cloud-native Network Functions (CNFs), Software as a Service (SaaS) applications, etc.

Service provider network 130 may also include one or more wireless networks and may include a number of transmission towers for receiving wireless signals and forwarding the wireless signals toward the intended destination, and multi-access edge computing (MEC) devices. Service provider network 130 may further include one or more satellite networks, one or more packet switched networks, such as an IP based network, a local area network (LAN), a personal area network (PAN), a WiFi network, a Bluetooth network, a wide area network (WAN), a fifth generation (5G) network, a fourth generation (4G) long term evolution (LTE) network, a 4G LTE Advanced network, a sixth generation (6G) network, an intranet, the Internet, or another type of network that is capable of transmitting signals/data. Service provider network 130 may provide packet-switched services and wireless IP connectivity to user devices 110 to provide, for example, data, voice, and/or multimedia services. In an exemplary implementation, service provider network 130 may provide connectivity services, such as E-Line services, SD-WAN services, IP services, etc., to user device 110-1 communicating with user device 110-2 via partner network 140.

Partner network 140 may include similar elements and networks as network 130 described above. However, partner network 140 may be associated with a different operator than network 130 and the service provider of network 130 may be acting as both an operator and a service provider providing a service traversing both operator A's and B's respective networks. Partner network 140 may include one or more wired, wireless and/or optical networks that are capable of receiving and transmitting data, voice and/or video signals, and include applications, such as applications provided as part of cloud service offerings. For example, partner network 140 may include one or more Ethernet networks, packet switched networks such as IP/MPLS networks, SDNs or other type of packet switched network, and provide applications or access to applications from a different operator/entity than network 130. In an exemplary implementation, partner network 140 may provide connectivity services, such as Access E-Line services, SD-WAN services, IP services, etc., and/or application services to user device 110-1 communicating with user device 110-2 via network 130 and partner network 140.

ENNI 150 represents the interface or boundary between operator network 130 and partner network 140 that may contain connectivity and application components. ENNI 150 may include one or more computing devices that provide interoperability for signals/data transmitted between network 130 and partner network 140, such as formatting frames, formatting Protocol Data Units (PDUs) of the application layer and layers below, enforcing bandwidth profiles, performing switching, etc.

The exemplary configuration illustrated in FIG. 1 is provided for simplicity. It should be understood that a typical environment may include more or fewer devices than illustrated in FIG. 1. For example, environment 100 may include a large number (e.g., thousands or more) of user devices 110, hundreds of UNIs 120, additional networks and corresponding ENNIs 150, internal network-to-network interfaces (INNIs), etc. In addition, network 130 and partner network 140 may include additional elements, such as Next Generation Node Bs (gNodeBs), Evolved Node Bs (eNodeBs), base stations, switches, gateways, routers, monitoring devices, etc., that aid in routing data.

In addition, various functions are described below as being performed by particular components in environment 100. In other implementations, various functions described as being performed by one device may be performed by another device or multiple other devices, and/or various functions described as being performed by multiple devices may be combined and performed by a single device.

As described above, in some situations, a party at user device 110-1 may wish to communicate with the party at user device 110-2. As also described above, such a connection may traverse the networks of two different operators, such as operator network 130 and operator network 140. In this example, the operator associated with network 130 may be referred to herein as Operator A, and the operator associated with network 140 may be referred to herein as Operator B. In such situations, Operator A may provide an MEF connectivity service or MEF cloud service including connectivity and applications to user device 110-1 that traverses service provider network 130 and partner network 140.

Figure 2A:
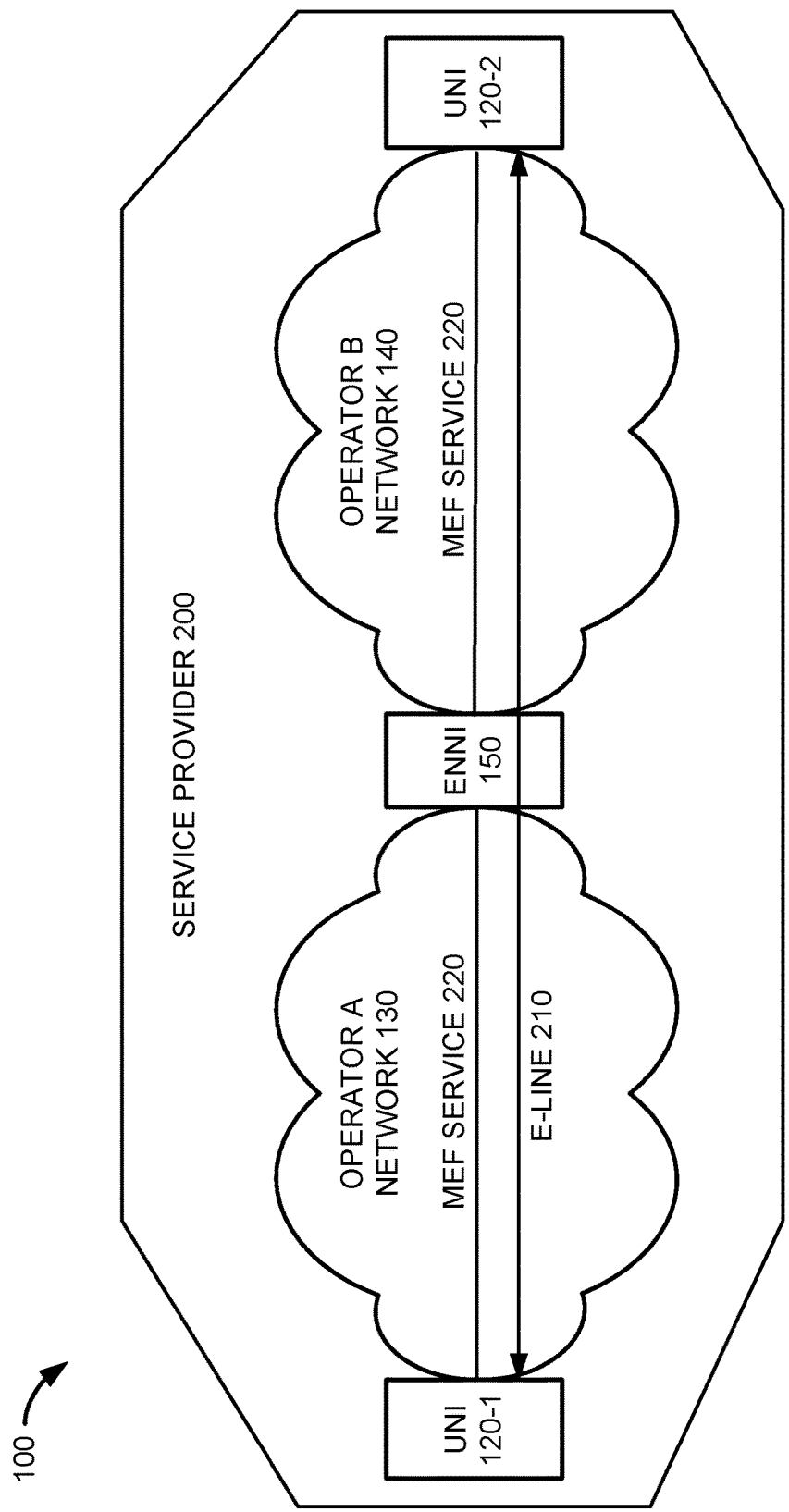
FIG. 2A illustrates exemplary connections implemented in a portion of the environment of FIG. 1.

For example, referring to FIG. 2A, service provider 200 included in environment 100 may include UNIs 120-1 and 120-2, ENNI 150 and Operators A and B discussed above with respect to FIG. 1. In some instances, service provider 200 may provide an interface for a user or customer to obtain cloud services via networks 130 and 140. In addition, in some instances, the entity corresponding to service provider 200 may be the same entity as the entity operating one of networks 130 and 140 (e.g., network 130) and a different entity may be associated with operating the other one of networks 130 and 140. Operator A and Operator B may set up a connection between UNI 120-1 and UNI 120-2 over their respective networks 130 and 140. The connection may correspond to an E-Line 210, such as an Ethernet virtual private line (EVPL) that traverses or engages both Operators networks. Operators A and B may each also set up connections from ENNI 150 to UNIs 120, labeled MEF service 220 in FIG. 2A. In some implementations, Operators A and B may wish to have a streamlined process for service modifications to a connectivity service, such as an E-Line service 210 and/or MEF service 220, to allow each Operator to quickly respond to changes caused by, for example, customer traffic growth. In one implementation, Operators A and B may generate an agreement in advance of any requests for changing the set of services and service attributes that can be modified, setting limits on such service attribute modifications and the corresponding impact on pricing, as described in detail below.

Once such an agreement is generated and finalized, service modifications may be later requested by Operators A and B without the need for submission of a new order request, obtaining cost quotes, etc. For example, if a service modification request from Operator A to Operator B is within pre-agreed limits, Operator B can immediately implement the change. The costs associated with the change will be charged according to the pre-agreed pricing. This process with respect to agreeing upon acceptable parameters for modifications and then implementing changes in accordance with the agreement is referred to as Service Control.

Figure 2B:
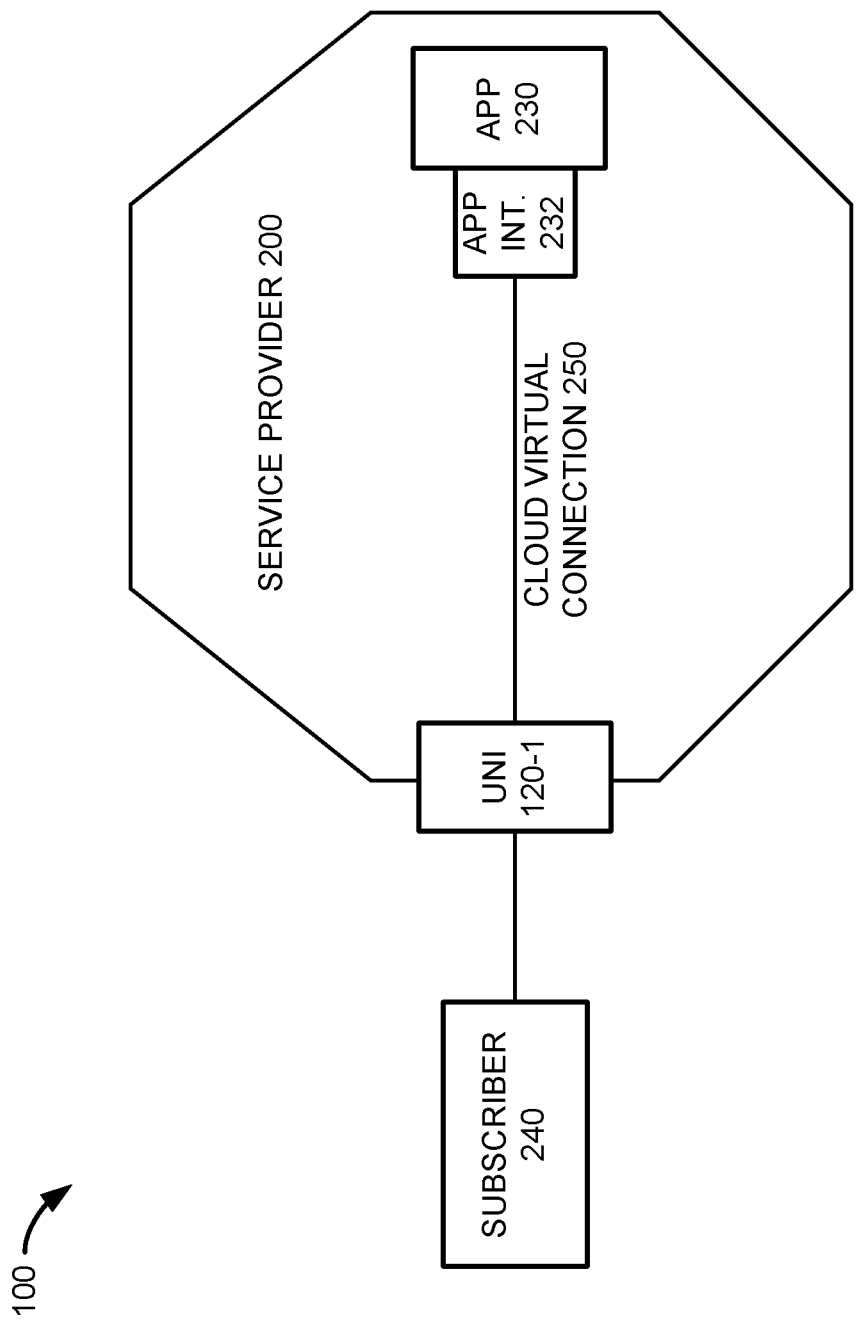
FIG. 2B illustrates a cloud application provided in a portion of the environment of FIG. 1.

In other implementations, service provider 200, including Operator A and/or Operator B may provide cloud applications to a user/subscriber. For example, referring to FIG. 2B, service provider 200 in environment 100 may include an application 230 and an application interface 232 that is accessible to subscriber 240 (also referred to as subscriber device 240). In this example, subscriber 240 may access application 230 via cloud UNI 120-1 and a cloud ENNI (not shown in FIG. 2B) to allow use of application 230. For example, subscriber 240 may connect to application 230 via cloud virtual connection 250 between cloud UNI 120-1 and application interface 232.

Application 230 may include one or more cloud applications, such as a virtual firewall, a virtual router, an Augmented Reality/Virtual Reality (AR/VR) application, etc., for use by subscriber 240 within service provider network 130 and partner network 140. For example, a virtual firewall or router may be implemented within networks 130 and/or 140 to provide security and routing related services. Application 230 may also include one or more applications provided to subscriber 240 via a Software as a Service (SaaS) model, Infrastructure as a Service (IaaS) including Virtual Machines and/or Containers, or Platform as a Service (PaaS) including VMs and/or Containers and application development tools, etc. For example, an SaaS service may include Microsoft Office 365 or another application residing in the cloud. Application interface 232 may allow subscriber 240 to access application 230 and submit modifications associated with application 230, such as changes to dates and/or times in which the application is to be implemented or executed by service provider 200, changes to operations provided by the application 230, changes to locations in which application (e.g., a virtual firewall) is deployed, etc. Application interface 232 may also allow subscriber 240 to submit modifications regarding resources of software applications, CNFs, or VNFs, such as bandwidth, virtual compute and virtual memory. Similarly, application interface 232 may allow subscriber 240 to submit modification requests regarding resources of VMs and Containers, such as physical compute, memory and storage resources corresponding to the underlying hardware used to provide the resources.

Subscriber 240 may include one or more user devices associated with an enterprise customer or an individual customer. For example, subscriber 240 may include a user device associated with company/enterprise that is responsible for requesting changes to application 230 on behalf of the company/enterprise. In each case, the changes may be submitted to application 230 via UNI 120-1 and application interface 232.

Figure 3:
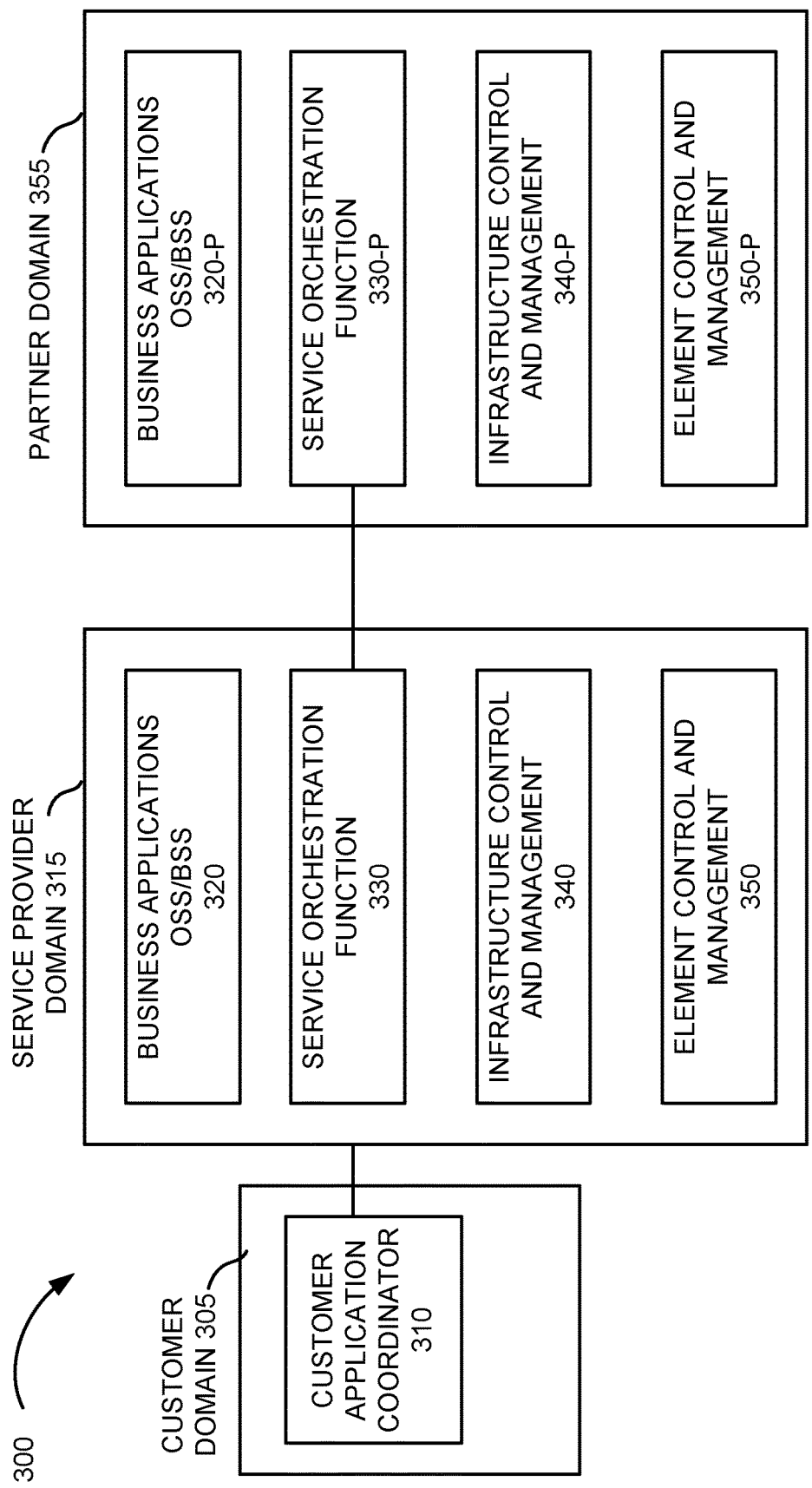
FIG. 3 illustrates an exemplary configuration of logic components associated with implementing a change to a service provided in the environment of FIG. 1.

FIG. 3 illustrates a network infrastructure 300 associated with and/or implemented in environment 100 in accordance with an exemplary implementation. In one implementation, a portion of environment 300 may be associated with the operator of network 130 (i.e., Operator A) and a portion of infrastructure 300 may be associated with the operator of partner network 140 (i.e., Operator B). For example, customer domain 305 and service provider domain 315 may be associated with the operator of network 130, and partner domain 355 may be associated with the operator of partner network 140.

Referring to FIG. 3, customer domain 305 includes customer application coordinator 310. Customer application coordinator 315 may represent a portal, website, or an Application Programming Interface (API) associated with the operator of network 130. Customer application coordinator 310 may be configured to receive a request from a customer, such as a request to change a parameter associated with a service provided by the operator of network 130 (e.g., a connectivity service, such as an E-Line service) and process the request in an on-demand manner without requiring processing of a new order and obtaining cost information, as described in detail below.

Service provider (SP) domain 315 may include business applications 320, Service Orchestration Function (SOF) 330, infrastructure control and management (ICM) 340, and element control and management (ECM) 350. Business applications 320 may include an operations support system (OSS)/billing support system (BSS) (also referred to herein as OSS/BSS 320) that includes logic and/or software associated with billing a customer for services provided by the operator of network 130. For example, if a customer changes a rate associated with a connectivity service, OSS/BSS 320 may receive information associated with the new rate and bill the customer the appropriate amount.

SOF 330 may include one or more processing devices, logic and/or software to handle service requests and initiate processing for handling change requests in an on-demand manner. For example, SOF 330 may include an API to interface with SOF 330-P to request a modification to a service, request topology information associated with network 140, identify elastic components/attributes in network 140, etc. SOF 330 may also interface with resources in network 130 to determine whether adequate resources are available to implement the requested change. SOF 330 may further interface with ICM 340 and ECM 350 to implement modifications to a service, as described in detail below. Furthermore, SOF 330 may interface with Customer Application Coordinator 310 to receive customer requests for service modification.

ICM 340 may include one or more processing devices, logic and/or software to determine whether portions of network 130 include adequate resources to handle a requested service change. For example, ICM 340 may determine whether network interfaces, such as UNIs, NNIs, ENNIs, are adequately configured to handle a requested service change.

ECM 350 may include one or more processing devices, logic and/or software to determine whether other portions of network 130 include adequate resources to handle a requested service change. For example, ECM 350 may determine whether the endpoints are adequately configured to handle a requested service change.

Partner domain 355 may be associated Operator B (e.g., partner network 140). Partner domain 355 may include business applications 320-P (also referred to as OSS/BSS 320-P), service orchestration function (SOF) 330-P, ICM 340-P and ECM 350-P. Business applications 320-P, SOF 330-P, ICM 340-P and ECM 350-P may be similar to elements 320, 330, 340 and 350 described above with respect to service provider domain 315, with the difference being that elements 320-P, 330-P, 340-P and 350-P perform the same or similar processing with respect to partner network 140, as described in detail below.

Although FIG. 3 shows exemplary components of network infrastructure 300, in other implementations, network infrastructure 300 may include fewer components, different components, differently arranged components, or additional components than depicted in FIG. 3. In addition, functions described as being performed by one of the components in FIG. 3 may alternatively be performed by another one or more of the components of network infrastructure 300.

Figure 4:
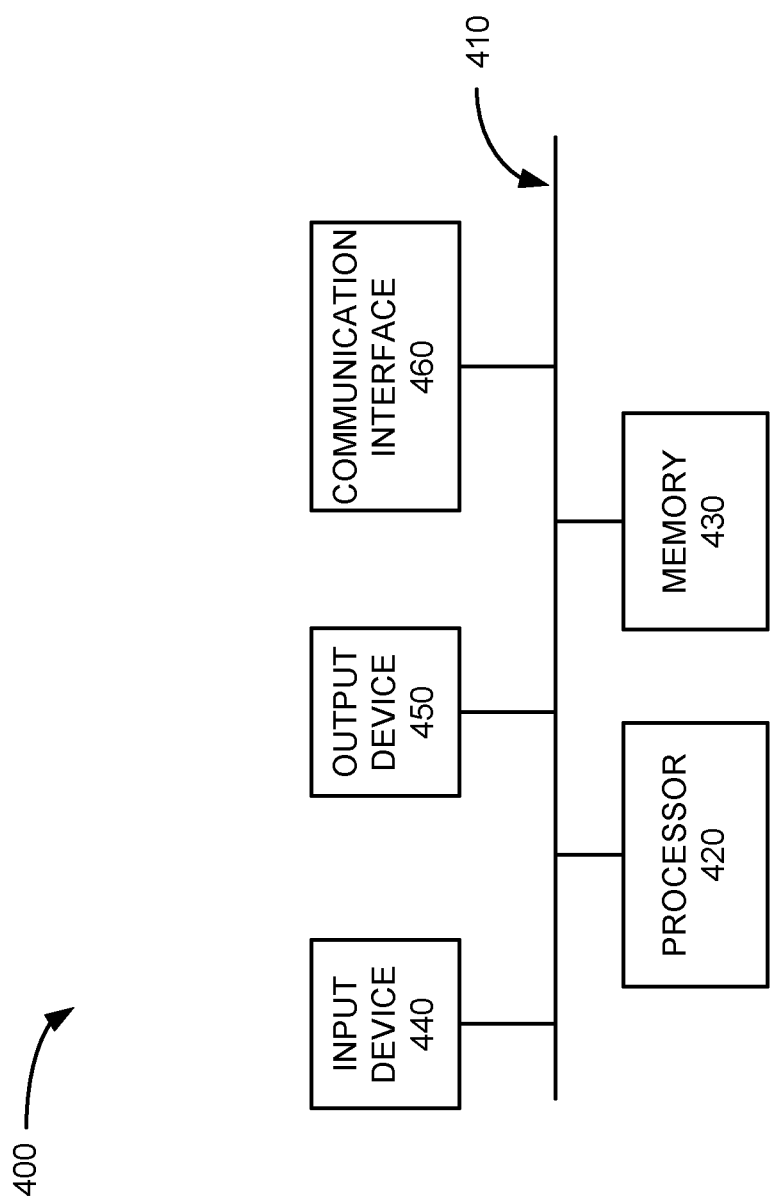
FIG. 4 illustrates an exemplary configuration of logic components associated with one or more of the devices of FIGS. 1-3.

FIG. 4 illustrates a device 400 which includes an exemplary configuration of elements used to implement one or more devices of environment 100 and/or implement one or more components illustrated in network infrastructure 300. For example, device 400 may include elements used to implement elements in service provider domain 315 and/or elements within service partner domain 355, such as OSS/BSS 320, SOF 330/330-P, ICM 340/340-P and/or ECM 350/350-P. Device 400 may also include elements used to implement devices in environment 100, such as user device 110, UNI 120, ENNI 150, application 230 and/or subscriber 240. Device 400 may further include elements used to implement VMs, Containers, VNFs, CNFs, etc. Referring to FIG. 4, device 400 may include bus 410, processor 420, memory 430, input device 440, output device 450 and communication interface 460. Bus 410 may include a path that permits communication among the elements of device 400.

Processor 420 may include one or more processors, microprocessors, or processing logic that may interpret and execute instructions. Memory 430 may include a random access memory (RAM) or another type of dynamic storage device that may store information and instructions for execution by processor 420. Memory 430 may also include a read only memory (ROM) device or another type of static storage device that may store static information and instructions for use by processor 420. Memory 430 may further include a solid state drive (SSD). Memory 430 may also include a magnetic and/or optical recording medium (e.g., a hard disk) and its corresponding drive.

Input device 440 may include a mechanism that permits a user to input information to device 400, such as a keyboard, a keypad, a mouse, a pen, a microphone, a touch screen, voice recognition and/or biometric mechanisms, etc. Output device 450 may include a mechanism that outputs information to the user, including a display (e.g., a liquid crystal display (LCD)), a printer, a speaker, etc. In some implementations, a touch screen display may act as both an input device and an output device.

Communication interface 460 may include one or more transceivers that device 400 uses to communicate with other devices via wired, wireless or optical mechanisms. For example, communication interface 460 may include one or more radio frequency (RF) transmitters, receivers and/or transceivers and one or more antennas for transmitting and receiving RF data via network 130 and/or partner network 140. Communication interface 460 may also include a modem or an Ethernet interface to a LAN, or other mechanisms for communicating with elements in a network, such as network 130 or partner network 140.

The exemplary configuration illustrated in FIG. 4 is provided for simplicity. It should be understood that device 400 may include more or fewer devices (e.g., a global positioning system (GPS) chipset) than illustrated in FIG. 4. In an exemplary implementation, device 400 may perform operations in response to processor 420 executing sequences of instructions contained in a computer-readable medium, such as memory 430. A computer-readable medium may be defined as a physical or logical memory device. The software instructions may be read into memory 430 from another computer-readable medium (e.g., a hard disk drive (HDD), SSD, etc.), or from another device via communication interface 460. Alternatively, hard-wired circuitry may be used in place of or in combination with software instructions to implement processes consistent with the implementations described herein. Thus, implementations described herein are not limited to any specific combination of hardware circuitry and software.

As described above, parties using cloud services (e.g., connectivity services and/or applications) that traverse or engage multiple service providers may be unable to make changes to such services in an on-demand manner (e.g., without having to submit a new service order, without having one or more service providers generate a cost quote associated with the order, etc.). In an exemplary implementation, operators may agree upon parameters associated with modifying services in advance of any service modification request, as well as agree to pricing terms associated with such service modifications, as described in detail below.

Figure 5:
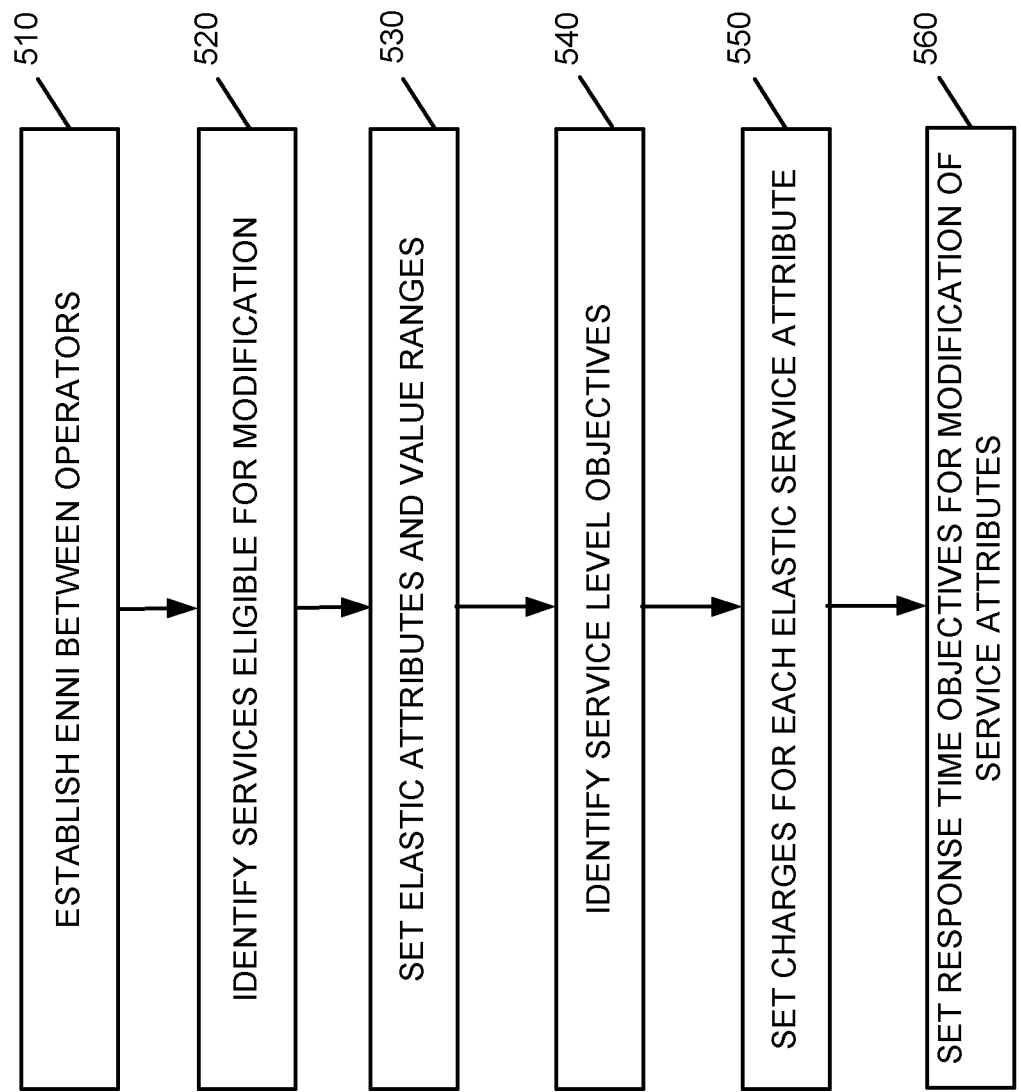
FIG. 5 is a flow diagram illustrating processing associated with establishing an agreement between entities associated with changes to a connectivity service such as an Ethernet service or changes to a cloud service.

FIG. 5 is a flow diagram illustrating processing associated with Service Control in environment 100. Processing may begin with two operators (e.g., Operators A and B) establishing an ENNI between the Operators' networks (block 510). For example, referring to FIG. 1, ENNI 150 represents an interface or boundary between network 130 and partner network 140 and ensures interoperability for data/signals transmitted between network 130 and partner network 140. For example, ENNI 150 may format frames transmitted to and received by ENNI 150, enforce bandwidth profiles, perform switching, etc. In this example, assume that Operators A and B select ENNI 150 as the ENNI to be used for services traversing networks 130 and 140.

Operators A and B may also identify services that are eligible for modification (block 520). For example, various connectivity service types, such as Access E-line services, SD-WAN services, IP services, etc., may be available for service modifications, such as modifications to data transmission rates for an E-line service (e.g., changes to a committed information rate (CIR)). Operators A and B may also identify locations and/or location addresses where the particular service types eligible for modification are available. Operators A and B may also identify cloud service applications, such as a virtual router application, a virtual firewall application, an SaaS applications, IaaS components, PaaS components, etc., that may be available for on-demand modifications.

Operators A and B may identify elastic attributes associated with the service types available for modification and set values or value ranges to be supported for the elastic attributes (block 530). The term "elastic" indicates the capability to modify an active service by changing the value of one or more service attributes (e.g., CIR, an excess information rate (EIR), committed burst size (CBS), excess burst size (EBS), etc.), associated with an service, such as an Ethernet virtual circuit (EVC). An Operator (e.g., Operator A or B) may also identify, a cloud application that is provided by that particular Operator to, for example, subscriber 240, along with elastic attributes associated with the cloud application. For example, elastic attributes associated with application 230 may include attributes associated with infrastructure components, such as compute, storage and memory resources or components associated with execution of application 230 (e.g., virtual compute, virtual memory and bandwidth, etc.).

In some implementations, Operators A and B may also identify and set operational service level objectives (SLOs) (block 540). For example, Operators A and B may determine that the percentage of valid modification requests successfully transmitted by Operator A and approved by Operator B, or transmitted by subscriber 240 and approved by Operator A or B, may be limited based on an SLO. By limiting the percentage of valid modification requests accepted, Operators A and B may make modifications in most situations, but have the ability to reject some modification requests in situations in which network resources and/or other parameters associated with the particular service provider's network make the modification request difficult or impossible to implement. The agreed upon SLO between Operators A and B may also be time-based in some implementations. For example, an SLO may indicate that an Operator is limited to a certain number of modification requests in a period of time (e.g., one day). Similar operational SLOs may be set between a user, such as an enterprise associated with subscriber 240, and a service provider or Operator.

Operators A and B may also set and agree to costs/charges for each elastic service attribute modification (block 550) and in some implementations, set response time objectives for modifications of service attributes (block 560). For example, Operators A and B may set a price associated with changing a transmission rate for an EVC from 5 megabits/sec (Mb/s) to 10 Mb/s, as well as set up a time period in which a requested change is to be implemented. In some implementations, a change request may include a start date and time for a modification to an elastic attribute. By agreeing to costs and/or response times in advance of any actual service modification requests, Operators A and B may ensure that adequate resources are available in their respective networks and ensure that most requests for modifications can be met/granted within cost/time parameters requested by the other Operator. Similar agreements may be set between a user (e.g., user device 110-1, subscriber 240, etc.) and a service provider or Operator for costs/charges for each elastic service attribute modification (block 550) and in some implementations, set response time objectives for modifications of service attributes (block 560).

Figure 6:
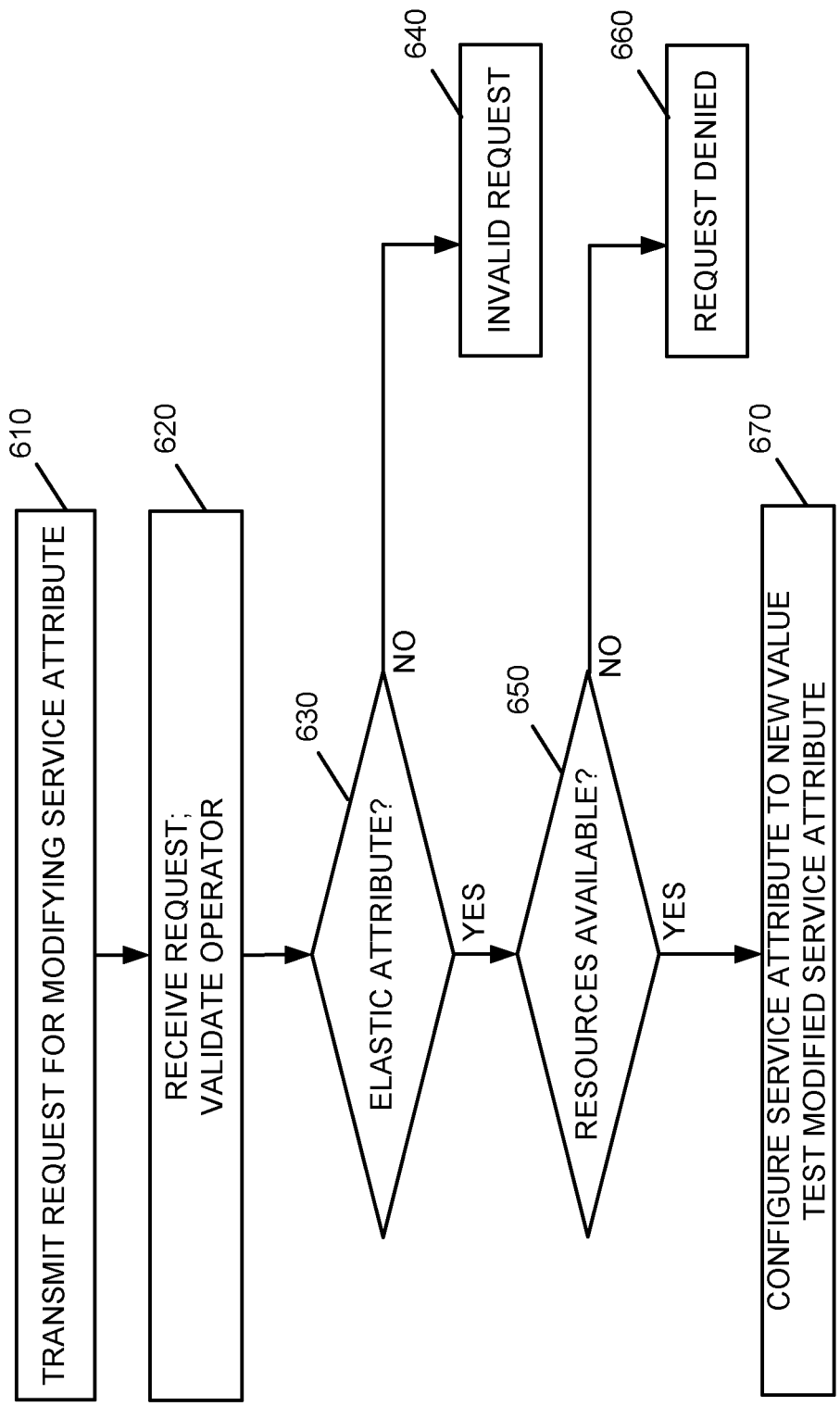
FIG. 6 is a flow diagram illustrating processing associated with requesting a service modification.

As described above, Operators A and B may agree upon service types, attributes associated with the service types that may be modified, values or ranges of values for the modified attributes, application attributes that may be modified, costs associated with the modifications, etc. FIG. 6 is a flow diagram illustrating exemplary processing associated with a modification of elastic attributes in environment 100. In this example, assume that an Operator (e.g., Operator A) would like to change the bandwidth or rate (e.g., CIR) for a connectivity service, such as an Access E-line service (e.g., the Operator B segment of the end-to-end service shown as E-Line 210 in FIG. 2A) based on, for example, customer traffic demand increases. Similarly, a user may want to change the bandwidth or rate (e.g., CIR) for an E-Line provided by a service provider.

Processing may begin with Operator A transmitting an Immediate Elastic Attribute Modification Request (referred to herein as the request) to Operator B requesting a change in an elastic attribute associated with a service (block 610). The request may include an identifier (ID) associated with Operator A, an identifier associated with Operator B, an agreement ID (e.g., a billing account number or a contract identifier) identifying the particular agreement associated with a service, a service ID identifying the particular service to be modified, a request type (e.g., immediate), service topology component IDs identifying particular components associated with the requested change, an end date and time associated with the request, and payload specific attributes, such as a requested change to the CIR for an EVC (e.g., from 5 Mb/s to 10 Mb/s). In some implementations, the request may also include a start date and time and whether the change is recurring based on the date and time. That is, the start date and time may indicate when the change is to be implemented and the end date and time may indicate when the service should revert back to the previous state. It should be understood that in some implementations, there will be no end date time and the change will be permanent. In other implementations, the change request may indicate that the service parameter change is to be recurring at a particular time each day. In still other implementations, the request may include information indicating that the elastic attribute parameter may revert to another value at the end time, and not the original value.

In this example, assume that Operator A has requested a change to a CIR parameter for an EVC. The EVC may be provided by the operator associated with network 130, which implements a segment of the EVC, such as an EVC associated with E-Line service 210 illustrated in FIG. 2A. In this example, Operator A may transmit a request for a CIR change via an API associated with SOF 330 to Operator B (e.g., to SOF 330-P).

Operator B may receive the request and validate that Operator A is authorized to request on-demand changes (block 620). For example, SOF 330-P in partner domain 355 may validate Operator A, based on, for example, the Operator ID included with the request. In some implementations, SOF 330-P may access OSS/BSS 320-P to validate Operator A.

Assume that the validation is successful. Operator B may determine if the request corresponds to a change for an elastic attribute that may be changed in an immediate, on-demand manner (block 630). For example, as described above with respect to FIG. 5, Operators A and B may have previously agreed on elastic attributes that may be changed in an immediate manner without Operator A having to submit a request for a new service, obtain cost information associated with the change, etc. In this example, SOF 330-P may also determine if the requested elastic attribute/CIR change is within limits or bounds agreed to by Operators A and B. For example, SOP 330-F may access a CIR list or table that provides information regarding available CIRs for the service provider. In some implementation example, SOF 330 may access OSS/BSS 320 to determine if the requested CIR change is within limits or bounds agreed to be Operators A and B.

If the request is associated with an attribute in which modifications have not previously been agreed upon and/or the requested change is not within previously agreed upon ranges (block 630—no), Operator B may return a response to Operator A indicating that the request is invalid (block 640). If, however, the request is associated with a permitted modification (i.e., the request is associated with an attribute that can be modified based on the agreement between Operators A and B and/or the requested attribute value change is within ranges that were also agreed upon (block 630—yes), Operator B may determine if adequate resources are available in partner network 140 to support the modification (block 650). For example, SOF 330-P may communicate with ICM 340-P to determine if network 140 includes adequate resources to support the modified attribute (i.e., CIR in this example) at the requested time based on network load, expected load, resources in service/out of service, etc. In this example, assume that Operator A has previously determined that network 130 is able to support the requested attribute value change.

If resources are not available in partner network 140 to support the requested change (block 650—no), Operator B may send a message to Operator A indicating that the request is denied (block 660). If, however, resources are available (block 650—yes), Operator B may configure the service attribute to the new value and reconfigure resources, if necessary, to support the new attribute value (block 670). In some implementations, Operator B may also test the modified attribute value to ensure that network 140 meets the new attribute value (block 670). For example, ICM 340-P may initiate a test of the services by sending test packets for the service (e.g., from ENNI 150 to user device 110-2) to test the service (e.g., test whether the actual data rate meets the new CIR value).

As described above, an Operator may request a change in a connectivity service associated with components included in another Operator's network. Similar processing may be performed when an Operator or user requests changes to a cloud application, such as application 230 in FIG. 2B. In other instances, a user (e.g., user device 110-1 in FIG. 1) or a subscriber (e.g., subscriber 240 in FIG. 2B) may request modifications from service provider 200 for a connectivity service between two UNIs (e.g., UNIs 120-1 and 120-2) that is supported by Operators A and B, or requests changes to a cloud service (e.g., an application) supported by a service provider. In such implementations, the user/subscriber may interface with a service provider in a similar manner as described above with respect to FIG. 6.

As also described above, an Operator or a user may request a change in a connectivity or cloud service. In some instances, an Operator or use may also want to submit a modification request cancellation. In such instances, the modification request cancellation may be performed in an immediate manner or in a scheduled manner using processing similar to that described above with respect to FIG. 6. In such cases, the changes to the requested connectivity or cloud service may be implemented to return the service to the previous operating parameters.

As described above, Operators A and B may negotiate types of changes that may be made to services in advance of actually making requests for service changes. In one implementation, Operators A and B may also communicate with each other to obtain information, such as service topology information prior to making change requests.

For example, FIG. 7 is a signal/message flow diagram associated with communications between Operators A and B. Referring to FIG. 7, Operator A may send a request for service topology information to Operator B (signal 710). This signal/message may be sent by SOF 330 to SOF 330-P via an API. Operator B may receive the message and validate Operator A using, for example, an ID associated with Operator A (block 712). After validating Operator A, Operator B may transmit information regarding the service topology associated with network 140, such as the topology identifying network elements involved in providing a service that traverses both networks 130 and 140, such as E-Line service 210 (signal 720). Operator A may receive and display the topology information (block 722). The service topology information may be displayed to a human administrator/network personnel at Operator A (e.g., via output device 450 in device 400) or an entity at service provider 200. In other implementations, the service topology information may be displayed to a party at user device 110 or subscriber 240.

Operator B may then request elastic component information regarding all of the network components associated with the received topology that may be modified based on the agreement between Operators A and B (signal 730). Operator B may receive the request and transmit information regarding all of the elastic components that may be modified based on then agreement between Operators A and B (signal 740). Operator A may receive the elastic component information and display the information (block 742). The elastic component information may be displayed to a human administrator/network personnel at Operator A (e.g., via output device 450 in device 400). The display may allow network personnel to easily identify network components and attributes that may be changed.

Operator A may then send a request for the elastic attribute parameters/value associated with the elastic components (signal 750). In response, Operator B may transmit elastic attribute values associated with each elastic network component to Operator A (block 760). Operator A may receive the information and display the information (block 762). The information may again be displayed to a human administrator/network personnel at Operator A. It should also be understood that in some implementations, the information provided in requests 730 and 750 may be combined in a single request and Operator B may provide both the components that may be modified and their corresponding attributes/parameters value in a single response.

In each case, after receiving the service topology information, the elastic component information and the corresponding parameters/attribute values for the elastic components, Operator A may then send a service modification request to Operator B (signal 770). For example, Operator A may request a change for the CIR from 5 Mb/s to 10 Mb/s with no end date or time. As described above, Operator B may verify resources and if available, configure the resources or reconfigure resources, if necessary, to fulfill the requested change (block 772). After the change has been implemented in network 140, Operator B may also send a message to Operator A indicating that the modification has been implemented (signal 780). In some instances, Operator B may perform testing to verify that the modification has been properly implemented in Operator B's network before sending the modification notification 780 to Operator A.

In this manner, Operators A and B may exchange topology information, elastic parameter values, etc., prior to an Operator requesting a change to an elastic parameter. This may result in a lower chance of a request being outside the agreed upon parameters and increase efficiency with respect to implementing changes in an Ethernet service traversing two service providers' networks (e.g., networks 130 and 140).

In some implementations, changes associated with a connectivity service (e.g., an E-Line service) may be automatically implemented based on, for example, capacity information in networks 130 and 140. For example, Operators A and B may agree to increase a data rate (e.g., CIR) when conditions in networks 130 and 140 permit such an increase. Such an agreement may be set in accordance with the agreement process described above with respect to FIG. 5.

Implementations have also been described above with respect to Operator A requesting a change with respect to a cloud service, such as a connectivity service or a cloud application, to Operator B. It should be understood that Operator B may make similar change requests to Operator A. In such situations, Operator B may act as the Service Provider for its own customers. In such a situation, Operator A may perform similar processing described above with respect to FIGS. 5-7. In addition, in some implementations, a user via user device 110-1 or a cloud subscriber via subscriber device 240 may request changes to a connectivity service, such as an Ethernet service, SD-WAN service, IP service, etc., or changes to cloud services including both connectivity services and cloud applications. In such situations, the interactions between user device 110-1 or subscriber device 240 and an operator or service provider may proceed in a similar manner as described above with respect to FIGS. 5-7.

Implementations described herein provide for modifications to services in an automated manner using, for example, one or more APIs. The modifications may be requested and implemented without requiring an operator, service provider or user/subscriber to submit a new order and obtain a cost quote from a partner operator or service provider implementing a portion of the service. In addition, by agreeing to information in advance of any change requests, the efficiency associated with communications between service providers involved in making a change is increased, thereby reducing time and costs associated with making changes to an existing service.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to implementing changes to cloud services, such as connectivity services (e.g., an Ethernet service, SD-WAN service, IP service, etc.) or cloud application services. In various implementations, the connectivity services may include 4G LTE services provided to a user, 5G connectivity services, including wireless connectivity services, provided to users via a radio access network (RAN), MEC devices and/or a core 4G LTE or 5G network. In such implementations, a user via user device 110-1 or subscriber device 240 may transmit requests for on-demand modifications via the 4G LTE or 5G networks. In other implementations, other types of services and changes to such services that traverse networks of more than one operator or service provider may be implemented in a similar manner.

Further, while series of acts have been described with respect to FIGS. 5 and 6 and signal flows/messages with respect to FIG. 7, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store, or employ personal information of individuals, groups or other entities, it should be understood that such information shall be used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   establishing, by a first service provider and via an application programming interface (API), an agreement with a second service provider, wherein the agreement identifies services that are permitted to be modified without submission of a new order from either the second service provider or the first service provider;
   receiving, from the second service provider, a first message requesting a change associated with a service, wherein the service includes routing data via a first network associated with the first service provider and a second network associated with the second service provider;
   determining, by the first service provider and in response to the first message, whether the requested change corresponds to a change that is permitted based on the agreement between the first service provider and the second service provider, and whether resources are available in the first network to implement the requested change;
   determining, by the first service provider and based on whether the change is permitted and whether resources are available in the first network to implement the requested change, whether the requested change is accepted; and
   in response to determining that the change is accepted, automatically implementing the change to the service in the first network.

2. The computer-implemented method of claim 1, further comprising:
   sending, by the first service provider, a second message to the second service provider, wherein the second message indicates whether the change is accepted.

3. The computer-implemented method of claim 1, wherein the change comprises a change to a parameter associated with a connectivity service or a change to an application provided by the first service provider.

4. The computer-implemented method of claim 3, wherein the connectivity service comprises an Ethernet Line (E-Line) service, and wherein the receiving comprises:
   receiving the first message via the API.

5. The computer-implemented method of claim 4, wherein the E-Line service is provided from a location serviced by the second service provider to a destination location serviced by the first service provider, wherein the second service provider is different from the first service provider.

6. The computer-implemented method of claim 1, wherein establishing the agreement further comprises:
identifying acceptable parameters or parameter ranges for attributes associated with a plurality of connectivity service types or cloud application services.

7. The computer-implemented method of claim 1, wherein the service includes a connectivity service and the requested change comprises a data rate or bandwidth change for the connectivity service.

8. The computer-implemented method of claim 1, further comprising:
receiving, from the second service provider, a request for topology information associated with components of the first network; and
providing, by the first service provider and to the second service provider, service topology information in response to the request for topology information.

9. The computer-implemented method of claim 1, further comprising:
providing, by the first service provider and to the second service provider, information identifying parameters associated with an Ethernet service that are permitted to be modified based on the agreement.

10. The computer-implemented method of claim 1, further comprising:
transmitting, by the first service provider and to the second service provider, a third message requesting a second change associated with a connectivity service, wherein the connectivity service includes routing data via the first and network and a second network associated with the second service provider; and
receiving, by the first service provider and from the second service provider, a fourth message indicating whether the second change is accepted.

11. A system, comprising:
a memory; and
at least one device associated with a first service provider and configured to:
establish, via an application programming interface (API), an agreement with a second service provider, wherein the agreement identifies services that are permitted to be modified without submission of a new order from either the second service provider or the first service provider,
receive, from the second service provider, a first message requesting a change associated with a service, wherein the service includes routing data via a first network associated with the first service provider,
determine, in response to the first message, whether the requested change corresponds to a change that is permitted based on the agreement between the first service provider and the second service provider,
determine, based on whether the change is permitted, whether the requested change is accepted, and
in response to determining that the change is accepted, automatically implementing the change to the service.

12. The system of claim 11, wherein when determining whether the requested change is accepted, the at least one device is further configured to:
determine whether resources are available in the first network to implement the requested change.

13. The system of claim 11, wherein the at last one device is further configured to:
send a second message to the second service provider, wherein the second message indicates whether the change is accepted.

14. The system of claim 11, wherein the change comprises a change to a parameter associated with a connectivity service, and wherein the at least one device is further configured to:
charge the second service provider for changes to the connectivity service based on the agreement.

15. The system of claim 11, wherein when establishing the agreement, the at least one device is configured to:
identify acceptable parameters or parameter ranges for attributes associated with a plurality of connectivity service types or cloud application services.

16. The system of claim 11, wherein the at least one device is further configured to:
receive, from the second service provider, a request for topology information associated with components of the first network, and
provide, to the second service provider, topology information in response to the request for service topology information.

17. The system of claim 16, wherein the at least one device is further configured to:
provide, to the second service provider, information identifying parameters associated with an Ethernet service that are permitted to be modified based on the agreement.

18. The system of claim 11, wherein the at least one device is further configured to:
transmit, to the second service provider, a third message requesting a second change associated with a connectivity service, wherein the connectivity service includes routing data via the first network and a second network associated with the second service provider; and
receive, by the first service provider and from the second service provider, a fourth message indicating whether the second change is accepted.

19. A non-transitory computer-readable medium having stored thereon sequences of instructions which, when executed by at least one processor associated with a first service provider, cause the at least one processor to:
establish, via an application programming interface (API), an agreement with a second service provider, wherein the agreement identifies services that are permitted to be modified without submission of a new order from either the first service provider or the second service provider;
receive, from the second service provider, a first message requesting a change associated with the service, wherein the service includes routing data via a first network associated with the first service provider and a second network associated with the second service provider;
determine, in response to the first message, at least one of whether the requested change corresponds to a change that is permitted based on the agreement between the first and second service providers, or whether resources are available in the first network to implement the requested change;
determine, based on at least one of whether the change is permitted or whether resources are available in the first network to implement the requested change, whether the requested change is accepted; and in response to determining that the change is accepted, automatically initiate implementation of the change to the service in the first network.

20. The non-transitory computer-readable medium of claim 19, wherein the instructions further cause the processor to:

transmit, to the second service provider, a third message requesting a second change associated with a connectivity service, wherein the connectivity service includes routing data via the first and second networks; and receive, from the second service provider, a fourth message indicating whether the second change is accepted.

* * * * *